(12) United States Patent
Esumi et al.

(10) Patent No.: US 9,661,259 B2
(45) Date of Patent: May 23, 2017

(54) PLAYBACK DEVICE, CONTROL METHOD, AND PROGRAM

(71) Applicant: MITSUBISHI ELECTRIC CORPORATION, Tokyo (JP)

(72) Inventors: Kenji Esumi, Tokyo (JP); Susumu Iino, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/762,778

(22) PCT Filed: Feb. 14, 2014

(86) PCT No.: PCT/JP2014/053467
§ 371 (c)(1),
(2) Date: Jul. 22, 2015

(87) PCT Pub. No.: WO2014/156359
PCT Pub. Date: Oct. 2, 2014

(65) Prior Publication Data
US 2016/0006975 A1    Jan. 7, 2016

(30) Foreign Application Priority Data

Mar. 28, 2013  (JP) ................. 2013-069715

(51) Int. Cl.
| | | |
|---|---|---|
| H04N 9/80 | (2006.01) |
| H04N 5/85 | (2006.01) |
| G06F 3/06 | (2006.01) |
| G11B 27/00 | (2006.01) |
| G11B 27/11 | (2006.01) |
| H04N 5/76 | (2006.01) |
| H04N 9/87 | (2006.01) |
| H04N 5/91 | (2006.01) |

(52) U.S. Cl.
CPC ................. H04N 5/85 (2013.01); G06F 3/06 (2013.01); G11B 27/00 (2013.01); G11B 27/11 (2013.01); H04N 5/76 (2013.01); H04N 9/87 (2013.01); H04N 5/91 (2013.01)

(58) Field of Classification Search
CPC ...................................... G11B 27/00
USPC ........................................ 386/248
See application file for complete search history.

(56) References Cited

U.S. PATENT DOCUMENTS

2004/0243625 A1   12/2004   Iwatsu
2007/0050849 A1    3/2007   Takashima
(Continued)

FOREIGN PATENT DOCUMENTS

CN    101131721 A    2/2008
CN    101785062 A    7/2010
(Continued)

*Primary Examiner* — Hung Dang
*Assistant Examiner* — Girumsew Wendmagegn
(74) *Attorney, Agent, or Firm* — Birch, Stewart, Kolasch & Birch, LLP

(57) ABSTRACT

In a case where a first access request from a playback controller (131) is a request for requesting reading or writing in a local storage area (111), a data access controller (135) causes a virtual-package-data file system processor (122) to perform reading or writing of virtual package data in the local storage area (111) with priority over the reading or writing of application data in an application data area (112) by a file system processor (123).

16 Claims, 5 Drawing Sheets

(56) References Cited

U.S. PATENT DOCUMENTS

| | | |
|---|---|---|
| 2007/0089146 A1 | 4/2007 | Ikeda et al. |
| 2007/0136282 A1 | 6/2007 | Takashima |
| 2007/0189718 A1 | 8/2007 | Kobayashi et al. |
| 2009/0269028 A1* | 10/2009 | Tanaka .................. G11B 20/10 386/248 |
| 2010/0034516 A1 | 2/2010 | Tanaka et al. |
| 2010/0046925 A1 | 2/2010 | Kusunoki et al. |
| 2011/0038616 A1 | 2/2011 | Kawakami et al. |

FOREIGN PATENT DOCUMENTS

| | | |
|---|---|---|
| JP | 2004-326923 A | 11/2004 |
| JP | 2007-150587 A | 6/2007 |
| JP | 2008-522343 A | 6/2008 |
| JP | 2008-527598 A | 7/2008 |
| JP | 5032510 B2 | 9/2012 |
| WO | WO 2005/036545 A1 | 4/2005 |
| WO | WO 2006/059888 A2 | 6/2006 |
| WO | WO 2006/073251 A2 | 7/2006 |
| WO | WO 2006/101047 A1 | 9/2006 |
| WO | WO 2007/058025 A1 | 5/2007 |
| WO | WO 2009/157163 A1 | 12/2009 |

\* cited by examiner

PLAYBACK DEVICE, CONTROL METHOD, AND PROGRAM

TECHNICAL FIELD

The present invention relates to playback device, a control method, and a program.

BACKGROUND ART

Recent in-vehicle audio-video (AV) equipment have become highly functional and needs to support many multimedia formats. Furthermore, the diversity of applicable input sources is also increasing: there are hard disk drives (HDD), nonvolatile memory devices such as SD card devices and USB (Universal Serial Bus) devices, optical disk devices such as CDs (Compact Disk), DVDs (Digital Versatile Disk), and BDs (Blu-ray Disk), portable AV players such as mobile audio players and mobile AV players, wireless networks such as Wi-Fi, and so on.

In addition, there is virtual package technology that can construct a virtual package by dynamically combining data recorded on a BD-ROM as a read-only optical disk on which moving picture content is recorded and data recorded on a rewritable recording medium such as a semiconductor memory card, hard disk, or the like, referred to as local storage. By virtually constructing a package, virtual package technology can expand the data recorded on read-only recording media. With virtual package technology, after a BD-ROM on which moving picture content is recorded has been distributed, the content of the work can be modified. For example, by providing, through a network, preview audio-video data streams previewing content of other works that have not been released yet, playback control information for managing those data streams, or the like, it is possible to constantly release and promote information about the latest works to the user, regardless of the time of distribution of the BD-ROM. There is the playback device described in patent reference 1 as the prior art of virtual package technology in relation to BD-ROMs.

PRIOR ART REFERENCE

Patent Reference

Patent reference 1: Japanese Patent Publication No. 5032510 (pp. 4-8, FIG. 1)

SUMMARY OF THE INVENTION

Problems to be Solved by the Invention

By the way, in the BD-ROM standards, there are requirements on local storage read speed, with levels provided according to the transfer speed. In a case where an application data area for recording application data is also formed in the writable recording medium in which the local storage area is formed, then because local storage area read requests and application data area read requests are processed by time-division multiplexing, there is a possibility that the local storage read speed may be reduced.

In addition, because devices that can be mounted in in-vehicle audio-video equipment are limited by required temperature conditions, if devices priced identically with the rewritable recording media used in household audio-video equipment are selected, their specifications are often lower. Therefore, costs can be kept down by forming an application data area and a local storage area in a single build-in memory mounted in in-vehicle audio-video equipment supporting BD playback function. In such cases, however, the local storage read speed of local storage need to be considered. For example, if a read request to the application data area occurs during reading of an audio-video data stream from the local storage area, the read speed of the audio-video data stream read from the local storage area is reduced, and this may cause problems such as jerkiness (missing frames) in the video played back or dropouts (skipping) in the audio. Similarly, in relation to write speed, if a write request for the application data area occurs during writing in the local storage area, the processing of one of the write requests will be delayed, which may cause interference with the viewing and listening process, deterioration in the operability of the in-vehicle audio-video equipment, or other such problems.

Therefore, an object of the present invention is to prevent the reduction of the transfer speed from a local storage area even when the local storage area and an application data area are formed on a recording medium with which sufficient bandwidth cannot be obtained for the maximum transfer speed.

Means for Solving the Problem

A playback device according to one aspect of the present invention includes a virtual-package-data file system processor to treat a combination of first data recorded in a first recording unit and second data recorded in a local storage area in a second recording unit including the local storage area and an application data area as virtual package data and to perform reading and writing of the virtual package data; a file system processor to perform reading and writing of application data recorded in the application data area; a playback controller to control playback of the virtual package data; a processing execution unit to process the application data; and a data access controller to cause the virtual-package-data file system processor to perform reading or writing of the virtual package data according to a first access request from the playback controller, the first access request requesting reading and writing of the virtual package data, and to cause the file system processor to perform reading or writing of the application data according to a second access request from the processing execution unit, the second access request requesting reading or writing of the application data; wherein in a case where the first access request from the playback controller is a request for requesting reading or writing in the local storage area, the data access controller causes the virtual-package-data file system processor to perform the reading or writing of the virtual package data with priority over the reading or writing of the application data by the file system processor.

A playback method according to one aspect of the present invention includes a playback control step for controlling playback of virtual package data; a virtual-package-data processing step for performing reading or writing of the virtual package data obtained by combining first data recorded in a first recording unit and second data recorded in a local storage area in a second recording unit according to a first access request from the playback control step; a processing execution step for processing application data recorded in an application data area in the second recording unit; a file system processing step for performing reading or writing of the application data recorded in the application data area in the second recording unit according to a second access request from the processing execution step; and a data access control step for, in a case where the first access request from the playback control step is a request for requesting reading or writing in the local storage area, causing the virtual-package-data processing step to perform the reading or writing of the virtual package data with priority over the reading or writing of the application data in the file system processing step.

A program according to one aspect of the present invention causes a computer to function as: a virtual-package-data file system processor to treat a combination of first data recorded in a first recording unit and second data recorded in a local storage area in a second recording unit including the local storage area and an application data area as virtual package data and to perform reading and writing of the virtual package data; a file system processor to perform reading and writing of application data recorded in the application data area; a playback controller to control playback of the virtual package data; a processing execution unit to process the application data; and a data access controller to cause the virtual-package-data file system processor to perform reading or writing of the virtual package data according to a first access request from the playback controller, the first access request requesting reading and writing of the virtual package data, and to cause the file system processor to perform reading or writing of the application data according to a second access request from the processing execution unit, the second access request requesting reading or writing of the application data; wherein in a case where the first access request from the playback controller is a request for requesting reading or writing in the local storage area, the data access controller causes the virtual-package-data file system processor to perform the reading or writing of the virtual package data with priority over the reading or writing of the application data by the file system processor.

Effects of Invention

According to an aspect of the present invention, it is possible to prevent the reduction of the transfer speed from a local storage area even when the local storage area and an application data area are formed on a recording medium with which sufficient bandwidth cannot be obtained for the maximum transfer speed.

MODE FOR CARRYING OUT THE INVENTION

First Embodiment

A first embodiment will be described below with reference to the drawings.

Figure 1:
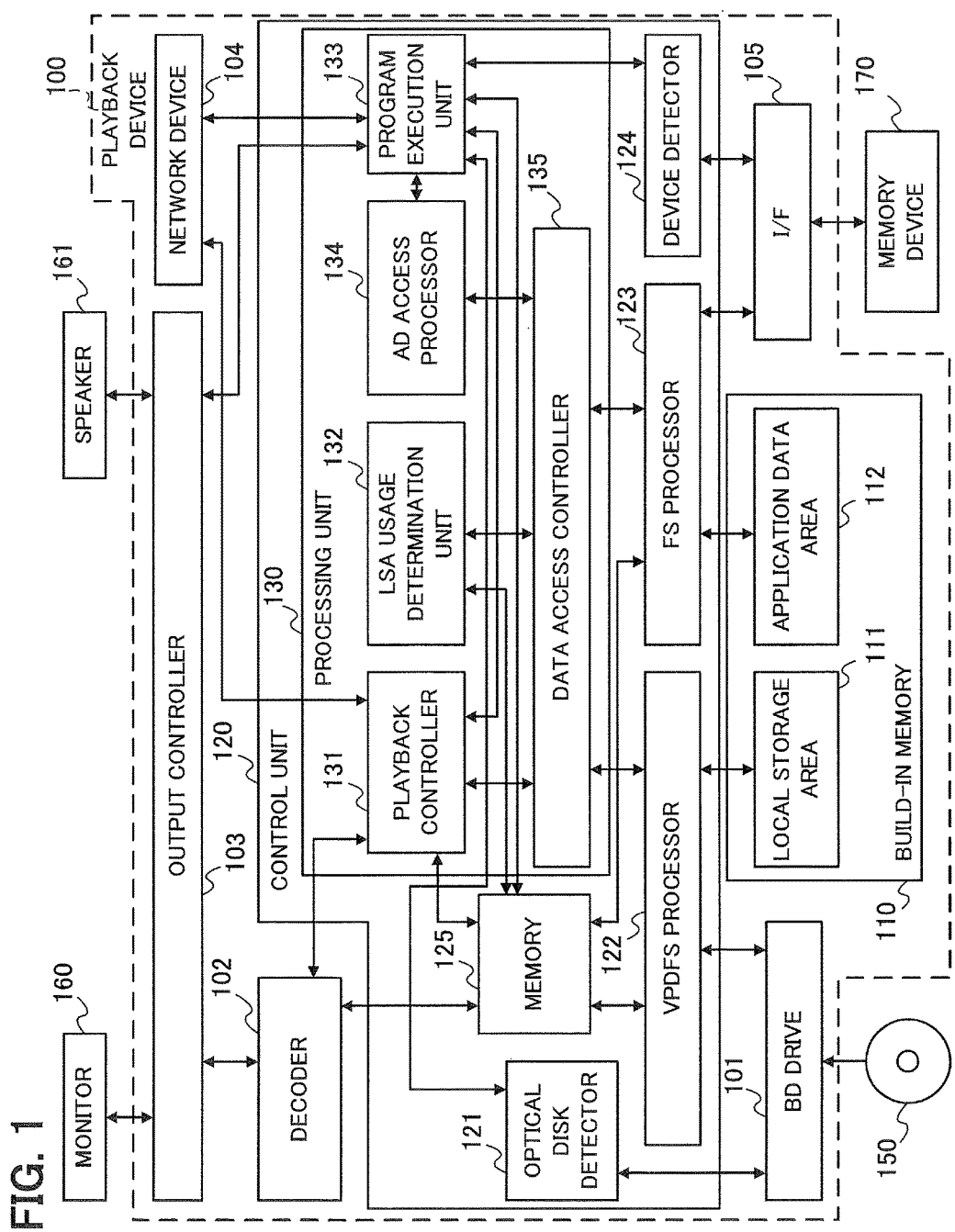
FIG. 1 is a block diagram schematically showing a configuration of a playback device according to a first embodiment.

FIG. 1 is a block diagram schematically showing a configuration of a playback device 100 according to the first embodiment. The playback device 100 combines data recorded on a playback-only recording medium with data recorded on a rewritable recording medium to construct virtual package data, thereby playing back audio-video content.

The playback device 100 includes a BD drive 101, a decoder 102, an output controller 103, a network device 104, an interface (hereinafter referred to as an I/F) 105, a build-in memory 110, and a control unit 120.

The BD drive 101 is a drive unit to read data recorded in a BD-ROM 150, which is a type of playback-only recording medium. When a BD-ROM 150 in which first data are recorded is inserted, the BD drive 101 functions as a first recording unit in which the first data are recorded.

The decoder 102 decodes compressed audio-video stream data, thereby converting them to audio data and video data.

The output controller 103 converts the video data decoded by the decoder 102 to a video signal receivable by a monitor 160. Here, in a case where GUI (graphic user interface) video data generated by the control unit 120 are input, the output controller 103 superposes the video data decoded by the decoder 102 and the GUI video data generated by the control unit 120 and converts the superposed video data to a video signal receivable by the monitor 160. The output controller 103 then outputs the converted video signal to the monitor 160.

In addition, the output controller 103 converts the audio data decoded by the decoder 102 to an audio signal receivable by a speaker 161 to output it. Here, if audio data such as operation sounds generated by the control unit 120 are present, the output controller 103 combines the audio data decoded by the decoder 102 with the audio data generated by the control unit 120 and converts the combined audio data to an audio signal receivable by the speaker 161. The output controller 103 then outputs the converted audio signal to the speaker 161.

Here, a playback unit to perform playback of data is configured by the decoder 102 and the output controller 103. The playback unit plays back, for example, virtual package data specified by the control unit 120.

The network device 104 is a communication unit for communicating with a network such as the Internet.

The I/F 105 is an interface unit for connection of an external device. Here the I/F 105 connects with a memory device 170 as a rewritable recording medium.

The build-in memory 110 is a shared rewritable recording medium (a second recording unit) to record both expanded data for expanding data recorded in the playback-only recording medium, and application data. The build-in memory 110 includes a local storage area 111, which is an area for recording expanded data, and an application data area 112 for recording application data managed by the control unit 120.

The local storage area 111 and the application data area 112 in the build-in memory 110 may be separated by partitions divided logically. In such cases, a maximum capacity for each of the areas can be determined and a different file system can be used for each of the areas. Furthermore, it may be possible to form each area in the same partition and to use the same file system for both of them. An EXT type file system or a FAT type file system is generally used as the file system.

The control unit 120 controls each unit in the playback device 100.

The control unit 120 includes an optical disk detector 121, a virtual-package-data file system processor (hereinafter referred to as a VPDFS processor) 122, a file system processor (hereinafter referred to as an FS processor) 123, a device detector 124, a memory 125, and a processing unit 130.

The optical disk detector 121 detects whether or not an optical disk has been inserted into the BD drive 101 and whether or not the optical disk has been ejected from the BD drive 101.

The VPDFS processor 122 treats a combination of data (first data) recorded in the BD-ROM 150 and data (second data) recorded in the local storage area 111 in the build-in memory 110 as virtual package data and performs reading and writing of the virtual package data.

Here, the VPDFS processor 122 generates virtual-package-data-file-system data enabling the combination of data recorded in the BD-ROM 150 and data recorded in the local storage area 111 in the build-in memory 110 to be treated as virtual package data. For example, the VPDFS processor 122 analyzes the UDF (Universal Disk Format) file system of the BD-ROM 150 and the file system of the build-in memory 110, thereby generating virtual-package-data-file-system data that enable the reading and writing of data files recorded in the BD-ROM 150 and data files in the local storage area 111 in the build-in memory 110. Then, the VPDFS processor 122 causes the memory 125 to store the generated virtual-package-data-file-system data.

In addition, by referring to the virtual-package-data-file-system data stored in the memory 125, the VPDFS processor 122 reads necessary data files from the BD-ROM 150 or the local storage area 111 in response to requests from the processing unit 130, and supplies the read data files to the processing unit 130. Furthermore, by referring to the virtual package-data-file-system data stored in the memory 125, the VPDFS processor 122 writes necessary data files in the local storage area 111 in response to requests from the processing unit 130.

The FS processor 123 performs reading and writing of application data. For example, the FS processor 123 analyzes the file system in the build-in memory 110, thereby generating file system data that enable the reading and writing of data files in the application data area 112, and causes the memory 125 to store the file system data in the memory 125. In addition, in a case where a memory device 170 is connected to the I/F 105, the FS processor 123 generates file system data for enabling the reading and writing of data files in the memory device 170 and causes the memory 125 to stores the file system data.

Further, by referring to the file system data stored in the memory 125, the FS processor 123 obtains necessary data files from the application data area 112 or the memory device 170 in response to instructions from the processing unit 130, and supplies the obtained data files to the processing unit 130.

The device detector 124 detects whether or not a device has been connected to the I/F 105 and whether or not a device has been disconnected from the I/F 105.

The memory 125 is a storage unit for storing data required for processing by the control unit 120. For example, the memory 125 stores the virtual-package-data-file-system data generated by the VPDFS processor 122 and the file system data generated by the FS processor 123. Furthermore, the memory 125 temporarily stores data files obtained from the BD-ROM 150, the build-in memory 110, or the device connected to the I/F 105. In addition, the memory 125 stores shared-memory-availability information generated by the processing unit 130. Furthermore, the memory 125 also stores various data generated by the processing unit 130.

The processing unit 130 executes processing performed in the playback device 100.

The processing unit 130 includes a playback controller 131, a local-storage-area usage determination unit (hereinafter referred to as an LSA usage determination unit) 132, a program execution unit 133, an application-data access processor (hereinafter referred to as an AD access processor) 134, and a data access controller 135.

The playback controller 131 controls the playback of the virtual package data. For example, the playback controller 131 specifies the virtual package data to be played back. Then, the playback controller 131 makes an access request to the data access controller 135, supplies the virtual package data to the decoder 102, and causes the decoder 102 to perform decoding.

Specifically, when the BD-ROM 150 is played back, the playback controller 131 obtains the playback control data files for playing back any of one or more audio-video stream data files in the virtual package data from at least one of the BD-ROM 150 and the local storage area 111 in the build-in memory 110. Then, according to the obtained playback control data files, the playback controller 131 obtains the relevant audio-video stream data files from at least one of the BD-ROM 150 and the local storage area 111 in the build-in memory 110, via the data access controller 135 and virtual-package-data file system processor 122.

Here, a playback control data file indicates to a file other than an audio-video stream data file and includes information for constructing title and chapter headings, information that ties this information to the audio-video stream data file, and so on. Playback control data files are generally recorded in the BD-ROM 150. When the BD-ROM 150 is inserted into the BD drive 101, the playback controller 131 reads the playback control data files recorded in the BD-ROM 150. At this time, in a case where BD-J programs are present in the BD-ROM 150, the playback controller 131 executes the BD-J programs. If the BD-J programs include, for example, a program for processing the recording of local storage data in the local storage area 111 by accessing the content producer's server, the playback controller 131 checks whether or not updated information is present on the content producer's server via the network device 104. Then, in a case where updated information is present, the playback controller 131 downloads the playback control data files and audio-video stream data files as the updated information, and records them in the local storage area 111 via the data access controller 135 and the VPDFS processor 122. After that, the playback controller 131 obtains the playback control data files from the BD-ROM 150 and local storage area 111 via the data access controller 135 and the VPDFS processor 122, on the basis of the virtual package data, and performs playback control.

The LSA usage determination unit 132 determines whether or not reading or writing of data is being performed in the local storage area 111 in the build-in memory 110. For example, the LSA usage determination unit 132 monitors data access by the data access controller 135 and determines whether or not the playback controller 131 is performing reading or writing of a data file in the local storage area 111 via the VPDFS processor 122. For example, the LSA usage determination unit 132 monitors data access by the data access controller 135 and determines whether or not reading or writing of the data is being performed by setting the shared-memory availability information stored in the memory 125 to 'valid' while a data read or write is being performed in the local storage area 111 in the build-in memory 110.

The program execution unit 133 executes predetermined processing by running application programs. Here, when application data recorded in the application data area 112 in the build-in memory 110 are required during the execution of the predetermined processing, the program execution unit 133 makes a request to the AD access processor 134 to obtain the relevant data file.

In response to requests from the program execution unit 133, the AD access processor 134 reads and writes application data files in the application data area 112 in the build-in memory 110 via the data access controller 135 and the FS processor 123.

Here, the program execution unit 133 and the AD access processor 134 constitute a processing execution unit for processing application data. The processing execution unit makes access requests to the data access controller 135 to obtain required application data.

According to a first access request from the playback controller 131, which requests the reading or writing of virtual package data, the data access controller 135 causes the VPDFS processor 122 to perform the reading or writing of the virtual package data. Further, according to a second access request from the AD access processor 134, which requests the reading or writing of application data, the data access controller 135 causes the FS processor 123 to perform the reading or writing of the application data.

In a case where an access request from the playback controller 131 requests reading or writing in the local storage area 111, the data access controller 135 causes the VPDFS processor 122 to perform the reading and writing of the virtual package data with priority over the reading and writing of application data by the FS processor 123.

Here, the memory device 170 records multimedia format as AV files. The memory device 170 is a rewritable recording medium, such as an SD card or HDD. The playback controller 131 reads the AV files from the memory device 170 via the data access controller 135 and FS processor 123, sends them to the decoder 102, and causes the decoder 120 to perform the decoding. This enables the playback device 100 to play back the AV files too.

Furthermore, in a case where an optical disk that does not use local storage, such as a DVD or a CD which is not shown in the figures, is inserted in the BD drive 101, the VPDFS processor 122 reads the data in the optical disk according to a UDF file system, ISO 9660 file system, or the like recorded in the optical disk, without constructing virtual-package-data-file-system data. This enables the playback device 100 to play back content recorded in this type of optical disk as well.

The playback device 100 described above may be implemented as, for example, a computer including a CPU (Central Processing Unit), a memory, an external recording device such as an HDD (Hard Disk Drive), a read/write device for reading and writing information on portable recording media such as a CD (Compact Disk) and a DVD (Digital Versatile Disk) media, and a communication device such as an NIC (Network Interface Card) for connection to a communication network.

For example, the BD drive 101 may be implemented by a read/write device. The build-in memory 110 may be implemented by an external recording device. The network device 104 may be implemented by a communication device. The control unit 120 may be implemented by loading a predetermined program recorded in the external recording device into the memory and executing it by the CPU.

The decoder 102 and output controller 103 may be implemented by dedicated hardware, or may be implemented by executing a predetermined program by the CPU.

The predetermined program may be downloaded from a recording medium via the read/write device or from a network via the communication device to the external recording device and then loaded into the memory and executed by the CPU. It may also be loaded directly into the memory from the recording medium via the read/write device or from the network via the communication device and executed by the CPU.

The playback device 100 may also include the monitor 160 and the speaker 161.

The specific operation of the playback device 100 according to the first embodiment will be described below.

<Regarding Processing when Read-Only Recording Medium (BD-ROM 150) is Inserted>

When a BD-ROM 150 is inserted into the BD drive 101, the BD drive 101 performs media discrimination and recognizes that it is a BD-ROM medium. The optical disk detector 121 detects that the BD-ROM medium is inserted, by means of a signal from the ATAPI-connected BD drive 101.

When the optical disk detector 121 detects the insertion of the BD-ROM medium, the program execution unit 133 makes a read request of file system data to the VPDFS processor 122 via the AD access processor 134 and the data access controller 135. According to the read request of file system data, the VPDFS processor 122 obtains the file system data recorded in the optical disk from the BD drive 101. Then, on the basis of the obtained file system data, the VPDFS processor 122 determines the logical format of the optical disk. For example, the VPDFS processor 122 determines whether it is any of the BDMV format and BDAV format defined in the BD standards, the DVD-Video format, DVD-VR format, and DVD-Audio format defined in the DVD standards, and a data disk format, differing from all of the above, in which moving picture files, audio files, or still picture files are recorded. The BDMV format, BDAV format, DVD-Video format, DVD-VR format, and DVD-Audio format are standard logical formats.

Having determined the logical format, the VPDFS processor 122 reports a determination result of the logical format to the program execution unit 133 via the data access controller 135 and the AD access processor 134. On the basis of the reported determination result of the logical format, the program execution unit 133 transmits logical format information indicating the determined logical format to the playback controller 131 in order to cause the playback controller 131 to perform playback control of the relevant logical format. For example, for the BD-ROM 150, the VPDFS processor 122 determines the BDMV format as the logical format. The program execution unit 133 transmits the logical format information indicating the BDMV format to the playback controller 131.

In a case where the logical format information received from the program execution unit 133 indicates the BDMV format, the playback controller 131 makes a mount processing request for the local storage area 111 to the VPDFS processor 122 through the data access controller 135. Upon receiving the mount processing request, the VPDFS processor 122 reads the file system data recorded in the local storage area 111, thereby enabling data files recorded in the local storage area 111 to be written and read. Further, from among the local storage data recorded in the local storage area 111 for a plurality of BD-ROMs, the VPDFS processor 122 finds the local storage data files corresponding to the data files recorded in the BD-ROM 150 inserted into the BD drive 101, and combines the data files recorded in the BD-ROM 150, which is a read-only recording medium, with the local storage data files recorded in the local storage area 111 in the build-in memory 110, which is a rewritable recording medium, thereby generating virtual-package-data-file-system data that can be processed as virtual package data. Then, the VPDFS processor 122 causes the memory 125 to store the generated virtual-package-data-file-system data.

Figure 2:
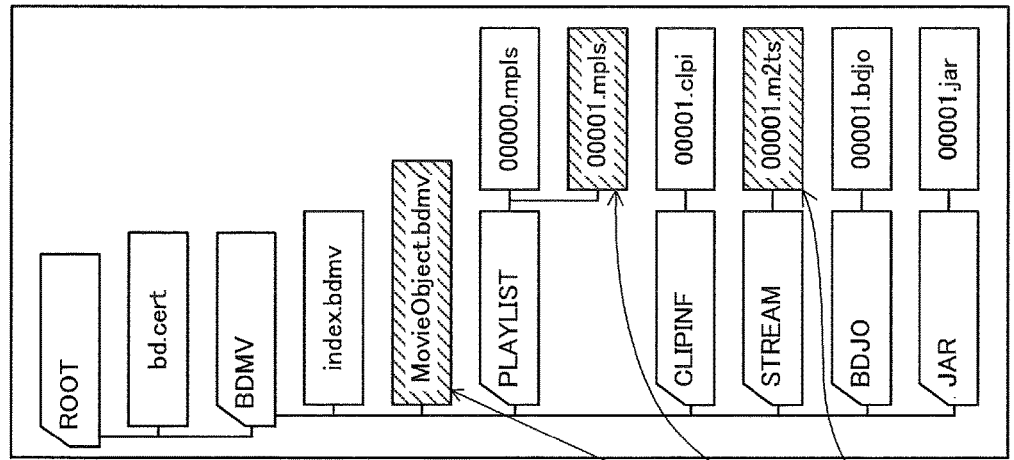
FIGS. 2(A)-2(C) are schematic diagrams showing an example of construction of virtual package data in the first embodiment.
Figure 2:
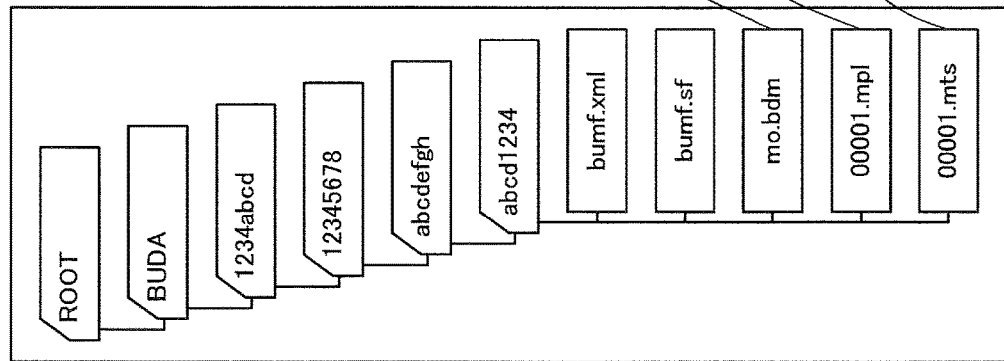
Figure 2:
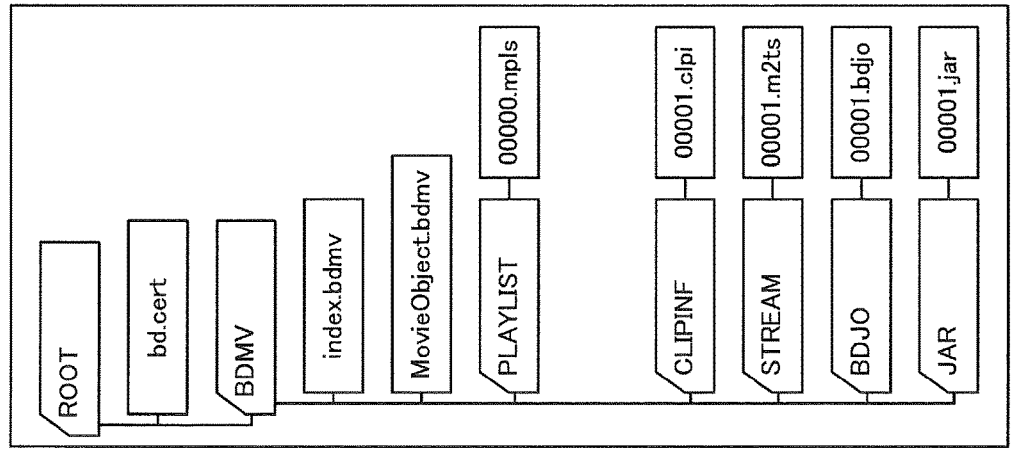

FIGS. 2(A) to 2(C) are schematic diagrams showing an example of the construction of the virtual package data.

FIG. 2(A) shows the data recorded in the BD-ROM 150, and FIG. 2(B) shows the data recorded in the local storage area 111.

As shown in FIG. 2(C), the VPDFS processor 122 constructs the virtual package data by replacing data files shown in FIG. 2(A) with data files shown in FIG. 2(B), or by adding the data files shown in FIG. 2(B) to the data files shown in FIG. 2(A).

Specifically, in FIG. 2(C), the 'MovieObject.bdmv' data file shown in FIG. 2(A) is replaced with the 'mo.bdm' data file shown in FIG. 2(B). Further, in FIG. 2(C), the '00001.mp1' data file shown in FIG. 2(B) is added to the 'PLAYLIST' folder in FIG. 2(A). Furthermore, in FIG. 2(C), the '00001.m2ts' data file shown in FIG. 2(A) is replaced with the '00001.mts' data file shown in FIG. 2(B).

The data files other than the data file included in the 'STREAM' folder of the 'BDMV' folder shown in FIG. 2(A) are playback control data files. Furthermore, the data files other than the 'rats' data file shown in FIG. 2(B) are playback control data files.

In a case where a BD-J program (a Java (registered trademark) program) is recorded in the BD-ROM 150, the playback controller 131 launches a Java virtual machine environment (JavaVM) and runs the BD-J program on the JavaVM. Besides, with the BD-J programs, the playback controller 131 decodes the audio-video data streams of content, activates game programs, and also connects via the network device 104 to a server or the like on the Internet, belonging to the content distributor of the BD-ROM 150. Then, the playback controller 131 can obtain local storage data such as the data shown in FIG. 2(B) and perform partial rewriting or adding of the data recorded in the BD-ROM 150. In addition to partial update data of the data recorded in the BD-ROM 150, game progress data, game scores, and other such data can also be stored in the local storage area 111.

<Regarding Method of Accessing to Read-Only Medium (BD-ROM 150)>

When accessing virtual package, the playback controller 131 makes a virtual package data access request to the data access controller 135.

Having received the virtual package data access request, the data access controller 135 makes an access-device-type check request to ask the VPDFS processor 122 whether it is a request of access to the local storage area 111 or a request of access to the BD drive 101. Then, in response to that, the data access controller 135 obtains an access-device-type check reply result from the VPDFS processor 122. The virtual package data access request includes full path information or relative path information for accessing the desired data file. On the basis of the path information, the VPDFS processor 122 refers to a file allocation table included in the virtual-package-data-file-system data stored in the memory 125 and identification information for identifying the recording device, and determines whether the access request is a request of access to the local storage area 111 or a request of access to the BD drive 101. Then, the VPDFS processor 122 generates the access-device-type check reply result according to the result of the determination.

If the access-device-type check reply result from the VPDFS processor 122 indicates a request of access to the BD drive 101, the data access controller 135 sends the VPDFS processor 122 a BD access request. The VPDFS processor 122 sends the received BD access request to the BD drive 101.

The BD drive 101 receives the BD access request from the VPDFS processor 122, and reads data from the inserted BD-ROM 150 according to this BD drive access request. Then, the BD drive 101 sends the read data to the VPDFS processor 122, and the VPDFS processor 122 causes the memory 125 to store the received data. Upon completing the reading of the data from the BD drive 101, the VPDFS processor 122 sends BD drive access-completion notification to the data access controller 135. When the data access controller 135 receives the BD drive access-completion notification, it sends virtual-package-data access-completion notification to the playback controller 131.

When the playback controller 131 receives the virtual-package-data access-completion notification, if the issued virtual package data access request is a read request of playback control data, the playback controller 131 itself processes the data. If the issued virtual package data access request is a read request of audio-video stream data, the playback controller 131 transfers the read data from the memory 125 to the decoder 102 and causes the decoder 102 to decode the audio-video stream data by making a decode start request to the decoder 102.

<Regarding Method of Access to Local Storage in Shared Rewritable Recording Medium (Build-in Memory 110)>

In this case, the playback controller 131 also makes a virtual package data access request to the data access controller 135. When the data access controller 135 receives the virtual package data access request, it makes an access-device-type check request to the VPDFS processor 122. In response to that, the data access controller 135 obtains an access-device-type check reply result from the VPDFS processor 122.

Here, if the access-device-type check reply result from the VPDFS processor 122 indicates an access request for the local storage area 111, the data access controller 135 makes a local storage accessibility check request to the LSA usage determination unit 132. In response to that, the data access controller 135 obtains a local storage accessibility check reply result from the LSA usage determination unit 132. Besides, If the shared-memory-availability information indicates 'valid', which indicates that the shared rewritable recording medium is in use, the LSA usage determination unit 132 generates a local storage accessibility check result reply indicating that access is not possible; if the shared-memory-availability information indicates 'invalid', the LSA usage determination unit 132 generates a local storage accessibility check reply result indicating that access is possible.

If the local storage accessibility check reply result obtained from the LSA usage determination unit 132 indicates that access is possible, the data access controller 135 sends local-storage access-start notification to the LSA usage determination unit 132, and then sends a local storage area access request to the VPDFS processor 122. The VPDFS processor 122 sends the received local storage area access request to the build-in memory 110.

If the received local storage area access request is a read request, the build-in memory 110 reads data from the local storage area 111. The build-in memory 110 sends the read data to the VPDFS processor 122, and the VPDFS processor 122 causes the memory 125 to store the received data. Upon completion of the reading of the data from the local storage area 111, the VPDFS processor 122 sends local-storage access-completion notification to the data access controller 135. When the data access controller 135 receives the local-storage access-completion notification, it sends local-storage access-end notification to the LSA usage determination unit 132, and then sends virtual-package-data access-completion notification to the playback controller 131.

When the playback controller 131 has received the virtual-package-data access-completion notification, if the issued virtual package data access request is a playback control data read request, the playback controller 131 itself processes the data in the same way as in the case of BD access. Furthermore, if the issued virtual package data access request is a read request of audio-video stream data, the playback controller 131 transfers the read data from the memory 125 to the decoder 102 and causes the decoder 102 to decode the audio-video stream data by making a decode start request to the decoder 102.

On the other hands, if the received local storage area access request is a write request, since a data stored in the memory 125 is sent from the VPDFS processor 122, the build-in memory 110 records the received data in the local storage area 111. Upon completion of the writing of the data to the local storage area 111, the VPDFS processor 122 sends a local-storage access-completion notification to the data access controller 135. Having received the local-storage access-completion notification, the data access controller 135 sends a local-storage access notification to the LSA usage determination unit 132, and then sends virtual-package-data access-completion notification to the playback controller 131.

Here, the LSA usage determination unit 132 sets the shared-memory availability information to 'valid' during the device access period, from the local-storage access-start notification to the local-storage access-end notification. If the LSA usage determination unit 132 receives the local-storage access-end notification, it sets the shared-memory-availability information to 'invalid'.

<Regarding Method of Access to Application Data Area in Shared Rewritable Recording Medium (Build-in Memory 110)>

The processing when the program execution unit 133 accesses the application data area 112 in the build-in memory 110 will now be described.

In the application data area 112, setup information data that the user has set on the playback device setup screen of the playback device 100, playback position resume information data created at the time when playback is stopped, playback list information for a memory device in which music files, moving picture files, or the like are recorded, program update data for the control unit 120 of the playback device 100, and other data are stored as files.

For example, in a case where the user displays the playback device setup screen, the program execution unit 133 makes an access request to the AD access processor 134 in order to read the playback device setup data file recorded in the application data area 112. Upon receiving the access request, the AD access processor 134 makes a file system data access request to the data access controller 135.

Having received the file system data access request, the data access controller 135 makes an access-device-type check request to the FS processor 123 to ask whether the access request is an access request for the application data area 112 or an access request for the memory device 170. In response to that, the data access controller 135 obtains an access-device-type check reply result from the FS processor 123. The file system data access request includes full path information or relative path information for accessing the desired file. On the basis of the path information, the FS processor 123 refers to the file allocation table included in the file system data stored in the memory 125 and identification information for identifying the recording device and thereby determining whether the access request is an access request for the application data area 112 or an access request for the memory device 170. Then, the FS processor 123 generates an access-device-type check reply result according to the result of the determination.

In a case where the access-device-type check reply result from the FS processor 123 indicates an access request for the application data area 112, the data access controller 135 makes an application data accessibility check request to the LSA usage determination unit 132. In a response to that, the data access controller 135 obtains an application-data accessibility-check reply result from the LSA usage determination unit 132. If the shared-memory-availability information stored in the memory 125 indicates 'valid', the LSA usage determination unit 132 generates an application data accessibility check result reply indicating that access is not possible, and if the shared memory availability information indicates 'invalid', the LSA usage determination unit 132 generates an application-data accessibility-check reply result indicating that access is possible.

If the application-data accessibility-check reply result obtained from the LSA usage determination unit 132 indicates that access is possible, the data access controller 135 sends application-data access-start notification to the LSA usage determination unit 132, and then sends an application data area access request to the FS processor 123. The FS processor 123 sends the received application data area access request to the build-in memory 110.

Having received the application data area access request from the FS processor 123, the build-in memory 110 reads the data from the application data area 112. Then, the build-in memory 110 sends the read data to the FS processor 123. The FS processor 123 stores the received data in the memory 125. Upon completion of the reading of the data from the application data area 112, the FS processor 123 sends application data area access-completion notification to the data access controller 135. Having received the application-data-area access-completion notification, the data access controller 135 sends application-data access-end notification to the LSA usage determination unit 132, and then sends file-system-data access-completion notification to the playback controller 131.

When the AD access processor 134 receives the file-system-data access-completion notification, it notifies the program execution unit 133 of access completion. The program execution unit 133 reads the playback device setup data from the memory 125 and constructs video data for the playback device setup screen as GUI graphic data. Then, the program execution unit 133 sends the generated video data to the output controller 103. The output controller 103 superposes the received video data on the video data decoded by the decoder 102, thereby displaying the playback device setup screen on the monitor 160.

Next, If, on the basis of the playback device setup screen displayed on the monitor 160, the user alters the setup content via an input unit such as a remote control which is not shown, the program execution unit 133 needs to write the playback device setup data back to the playback device setup data file in the application data area 112. Accordingly, in order to write the altered playback device setup data file in the application data area 112, the program execution unit 133 makes an access request to the AD access processor 134. Having received the access request, the AD access processor 134 makes a file system data access request to the data access controller 135.

If the data access controller 135 receives the file system data access request, it makes an access-device-type check request to the FS processor 123 to ask whether the access request is an access request for the application data area 112 or an access request for the memory device 170. Here, if the access-device-type check reply result from the FS processor 123 indicates an access request for the application data area 112, the data access controller 135 makes an application data accessibility check request to the LSA usage determination unit 132. If the application-data accessibility-check reply result obtained from the LSA usage determination unit 132 indicates that access is possible, the data access controller 135 sends application-data access-start notification to the LSA usage determination unit 132, and then sends the FS processor 123 an application data area access request. The FS processor 123 sends the received application data area access request to the build-in memory 110.

When the build-in memory 110 receives the application data area access request from the FS processor 123 and also receives the playback device setup data stored in the memory 125 from the FS processor 123, it records the received playback device setup data as a playback setup data file in the application data area 112. Upon completion of the writing of the data to the application data area 112, the FS processor 123 sends application-data-area access-completion notification to the data access controller 135. Upon receiving the application-data-area access-completion notification, the data access controller 135 sends application-data access-end notification to the LSA usage determination unit 132, and then sends file-system-data access-completion notification to the AD access processor 134. Having received the file-system-data access-completion notification, the AD access processor 134 notifies the program execution unit 133 of access completion.

Here, the LSA usage determination unit 132 sets the shared-memory availability information to 'valid' during the device access period, from the local-storage access-start notification to the local-storage access-end notification. When the LSA usage determination unit 132 receives the local-storage access-end notification, it sets the shared-memory-availability information to 'invalid'.

<Regarding Method of Access to Rewritable Recording Medium (Memory Device 170)>

A method of accessing the memory device 170, which is not a shared rewritable recoding medium, will also be described. As an example, playback processing of multimedia format AV files such as music files, still-image files, or moving picture files recorded in the memory device 170 will be described.

When the user connects the memory device 170 to the interface 105, the device detector 124 detects that a device is connected to the interface 105. When the device detector 124 detects the connection of a device to the interface 105, the program execution unit 133 obtains the device type of the device connected to the interface 105. In a case where the device type is a memory device, in order to construct the playback list screen for the music files, still-image files, or moving picture files from the directory file structure recorded in the memory device 170, the program execution unit 133 makes an access request to the AD access processor 134. Having receives the access request, the AD access processor 134 makes a file system data access request to the data access controller 135.

Upon receiving the file system data access request, the data access controller 135 makes an access-device-type check request to the FS processor 123 to ask whether the access is an access request for the application data area 112 or an access request for the memory device 170. In response to that, the data access controller 135 obtains an access-device-type check reply result from the FS processor 123.

If the access-device-type check reply result from the FS processor 123 indicates an access request to the memory device 170, the data access controller 135 sends the FS processor 123 a memory device access request. The FS processor 123 sends the received memory device access request to the memory device 170 via the interface 105.

The memory device 170 receives the memory device access request from the FS processor 123 and reads the file system data. Then, the memory device 170 sends the read file system data to the FS processor 123. The FS processor 123 stores the received file system data in the memory 125. Upon completion of the reading of the file system data, the FS processor 123 sends a memory-device access-completion notification to the data access controller 135. Having received the memory-device access-completion notification, the data access controller 135 sends a file-system-data access-completion notification to the AD access processor 134.

The AD access processor 134 receives the file-system-data access-completion notification and notifies the program execution unit 133 of access completion. By reading the file system data stored in the memory 125, the program execution unit 133 constructs the video data for a playback list screen on the basis of the directory files recorded in the memory device 170. The program execution unit 133 then sends the generated video data to the output controller 103. The output controller 103 superposes the received video data on the video data decoded by the decoder 102, thereby displaying the playlist screen on the monitor 160.

Next, in a case where, on the basis of the playback list screen displayed on the monitor 160, the user selects content to be played back via an input unit such as a remote control which is not shown, the program execution unit 133 notifies the playback controller 131 of the AV file information corresponding to the content selected by the user and makes a content playback request.

When the playback controller 131 accesses to the AV file, it makes a file system access request to the data access controller 135. Having received the file system access request, the data access controller 135 makes an access-device-type check request to the FS processor 123 to ask whether the access request is an access request for the application data area 112 or an access request for the memory device 170. In response to that, the data access controller 135 obtains an access-device-type check reply result from the FS processor 123.

If the access-device-type check reply result from the FS processor 123 indicates an access request to the memory device 170, the data access controller 135 sends a memory device access request to the FS processor 123. The FS processor 123 sends the received memory device access request to the memory device 170 via the interface 105.

The memory device 170 receives the memory device access request from the FS processor 123, reads the AV file, and sends the read AV file to the FS processor 123. The FS processor 123 stores the received AV file in the memory 125. It is assumed that the AV file being read here is an audio-video data stream. Upon completion of the reading of the data, the FS processor 123 sends a memory-device access-completion notification to the data access controller 135. When the data access controller 135 receives the memory-device access-completion notification, it sends file-system-data access-completion notification to the AD access processor 134.

Having received the file-system-data access-completion notification, the playback controller 131 transfers the audio-video data stream stored in the memory 125 to the decoder 102 and causes the decoder 102 to decode the audio-video stream data.

To construct a highly functional playback list screen, the program execution unit 133 may have a search function in which, by reading tag information recorded in the header files of music files and performing processing similar to processing described above on the artist information, title information, album information, composer information, and so on included in the tag information, it constructs a database of playback list and sorts the playback list on the playback list screen.

It is also possible to shorten the processing time for reconstructing the database of playback list by storing the database information of playback list in the application data area 112 as a playback list database file and, when the user connects and disconnects memory devices 170, determining whether or not the connected memory device 170 is the memory device that was being used at the time of storing the playback list database file.

So far, the processing when a read-only recording medium is inserted, the access method to the read-only recording medium, the access method to the local storage area in a shared rewritable recording medium, the access method to the application data area in the shared rewritable recording medium, and the access method to the rewritable recording medium have been described. Next, access processing including a case where another area in the build-in memory 110 is accessed when the shared-memory-availability information possessed by the LSA usage determination unit 132 indicates 'valid' will be described with FIG. 3 referred to.

Figure 3:
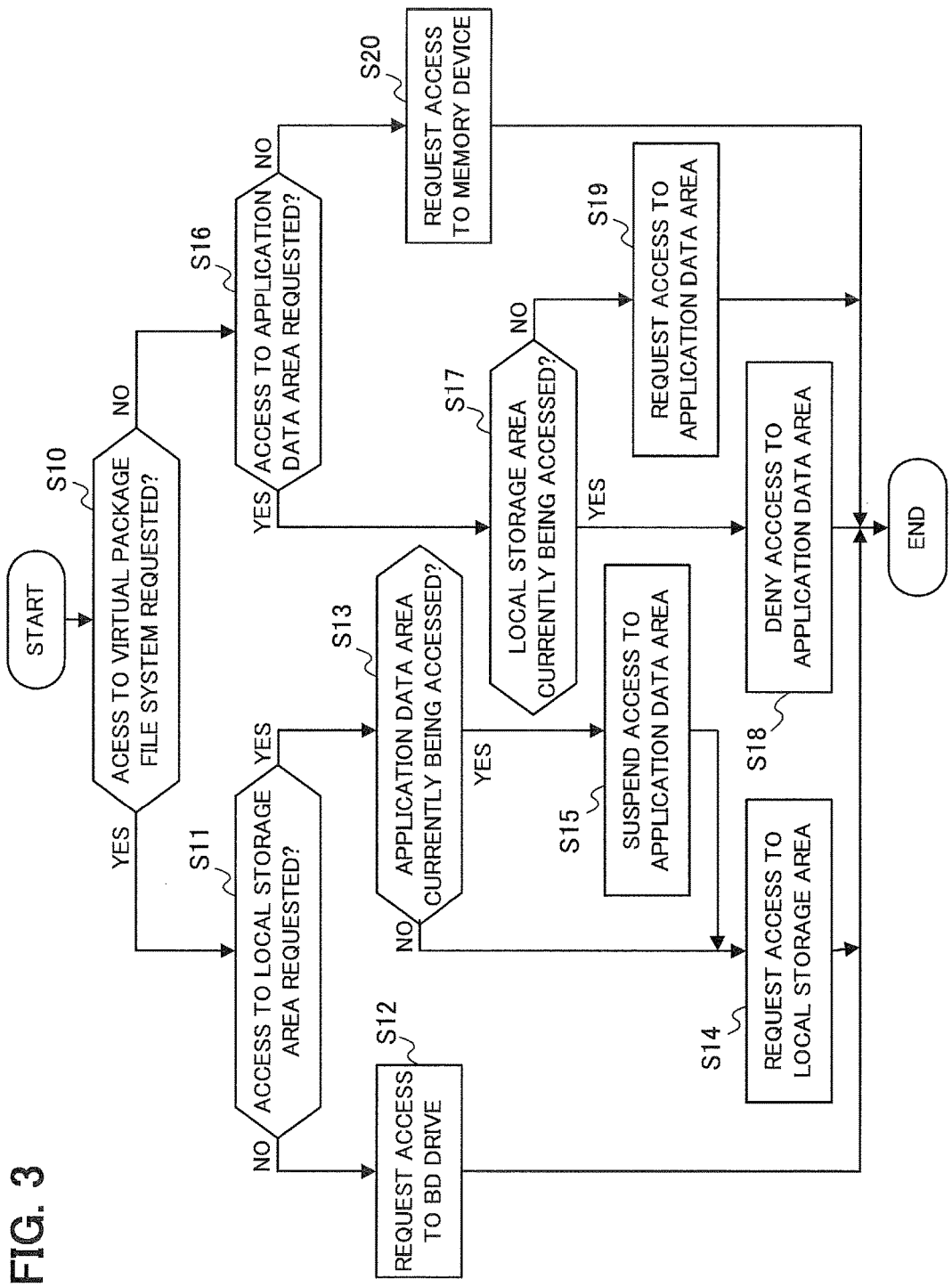
FIG. 3 is a flowchart showing processes performed in the data access controller in the first embodiment.

FIG. 3 is a flowchart showing a process performed in the data access controller 135. The flow in FIG. 3 is started when the data access controller 135 receives an access request.

In step S10, the data access controller 135 determines whether or not the received access request is an access request for the virtual-package-data file system. If the received access request is a virtual package data access request, the data access controller 135 determines that the received access request is an access request for the virtual-package-data file system (S10: Yes) and the process proceeds to step S11. On the other hands, If the received access request is a file system data access request, the data access controller 135 determines that the received access request is not an access request for the virtual-package-data file system (S10: No) and the process proceeds to step S16.

In step S11, the data access controller 135 determines whether or not the received access request is an access request to the local storage area 111. If the access-device-type check reply result obtained in response to the inquiry to the VPDFS processor 122 indicates an access request for the BD drive 101, the data access controller 135 determines that the received access request is not an access request for the local storage area 111 (S11: No) and the process proceeds to step S12. On the other hands, If the access-device-type check reply result indicates an access request for the local storage area 111, the data access controller 135 determines that the received access request is an access request for the local storage area 111 (S11: Yes) and the process proceeds to step S13.

In step S12, the data access controller 135 requests access to the BD drive 101.

In step S13, the data access controller 135 determines whether or not the application data area 112 is currently being accessed. If the local storage accessibility check reply result obtained in response to the inquiry to the LSA usage determination unit 132 indicates that access is possible, the data access controller 135 determines that the application data area 112 is not being accessed (S13: No) and the process proceeds to step S14. On the other hands, if the local storage accessibility check reply result indicates that access is not possible, the data access controller 135 determines that the application data area 112 is currently being accessed (S13: Yes) and the process proceeds to step S15.

In step S14, the data access controller 135 requests access to the local storage area 111.

In step S15, the data access controller 135 suspends the access to the application data area 112. The process then proceeds to step S14, in which the data access controller 135 requests access to the local storage area 111. When suspending access to the application data area 112 in step S15, the data access controller 135 sends an application-data-area access-cancellation notification to the AD access processor 134 to inform it that the access is suspended until a local-storage access-completion notification is received from the VPDFS processor 122. After receiving the local-storage access-completion notification from the VPDFS processor 122, the data access controller 135 sends an application-data access-possible notification to the AD access processor 134, informing it that application data access requests may be possible again. When the AD access processor 134 receives the application-data-area access-cancellation notification, it informs the program execution unit 133 that the access has been cancelled. Further, when the AD access processor 134 receives the application-data access-possible notification, it informs the program execution unit 133 that access is possible. After receiving an access-cancellation notification, the program execution unit 133 delays making an access request for the application data area 112 to the AD access processor 134 until an access-possible notification is received. In other words, if the program execution unit 133 receives an access-cancellation notification, it sends the cancelled access request (the access request for which a cancellation notification was received before access completion is received) to the AD access processor 134 again after the access-possible notification is sent.

In step S16, the data access controller 135 determines whether or not the received access request is an access request for the application data area 112. If the access-device-type check reply result in response to the inquiry to the FS processor 123 indicates an access request for the application data area 112, the data access controller 135 determines that the received access request is an access request for the application data area 112 (S16: Yes) and the process proceeds to step S17. If the access-device-type check reply result indicates an access request for the memory device 170, the data access controller 135 determines that the received access request is not an access request for the application data area 112 (S16: No) and the process proceeds to step S20.

In step S17, the data access controller 135 determines whether or not the local storage area 111 is currently being accessed. If the application data accessibility check replay result in response to the inquiry to the LSA usage determination unit 132 indicates that access is not possible, the data access controller 135 decides that the local storage area 111 is currently being accessed (S17: Yes) and the process proceeds to step S18. If the application-data accessibility-check reply result indicates that access is possible, the data access controller 135 decides that the local storage area 111 is not currently being accessed (S17: No) and the process proceeds to step S19.

In step S18, in order to deny access to the application data area, the data access controller 135 sends an application-data-area access-cancellation notification to the AD access processor 134. Having received the application-data-area access-cancellation notification, the AD access processor 134 notifies the program execution unit 133 of access cancellation. In the same way as step S15, the program execution unit 133 delays making an access request for the application data area 112 to the AD access processor 134 until an access-possible notification is received.

In step S19, the data access controller 135 makes an access request for the application data area 112.

In step S20, the data access controller 135 makes an access request for the memory device 170.

As mentioned above, according to the playback device 100 in the first embodiment, it is possible to prevent reducing the transfer speed required in the local storage, even when the same device is used as both a local storage area device and an application data area device. When access to the local storage area 111 is requested during access to the application data area 112, the access to the application data area 112 is suspended so that the local storage area 111 can be accessed preferentially. When access to the application data area 112 is requested during access to the local storage area 111, the access to the application data area 112 can be restrained.

In the first embodiment described above, in response to an access request from the playback controller 131 or AD access processor 134, the data access controller 135 determines any one to be access from among a read-only recording medium, a local storage area in a shared rewritable recording medium, an application data area in the shared rewritable recording medium, or a rewritable recording medium, and makes an access request to the VPDFS processor 122 or FS processor 123 according to the access status of the shared rewritable recording medium. This scheme is not limiting, however. For example, while (a virtual file system of) virtual package data are (is) present, the LSA usage determination unit 132 may set the shared-memory availability information to 'valid', which indicates that the memory having the local storage area 111 is busy. This enables the data access controller 135 to determine whether or not virtual package data have been constructed from the BD drive 101 and local storage area 111 and then request access to the application data area 112 can be done with only steps S16-S20 in FIG. 3. This can prevent, in the same way as above configuration, the required local storage transfer speed for a local storage from being reduced.

In addition, the data access controller 135 may also monitor the maximum transfer speed of the build-in memory 110 including the local storage area 111 and application data area 112, and may perform access even when access to the local storage area 111 is carrying out, in a case where the file size of an access file corresponding to an access request from the AD access processor 134 is smaller than a predetermined value and transfer speed required for a local storage can be obtained even if concurrent access is performed. Therefore, transfer speed required for local storage is maintained even if the local storage area 111 and application data area 112 are accessed concurrently.

In the first embodiment described above, the local storage area 111 and the application data area 112 are formed in the build-in memory 110, but the configuration is not limited to this. For example, it is possible that a build-in memory 110 is not included in the playback device 100 and processing similar to the above is carried out with a the local storage area 111 and application data area 112 which are formed in the memory device 170.

In the first embodiment described above, the LSA usage determination unit 132 sets the shared-memory-availability information to 'valid' during device access periods, that is, during the period from a local-storage access-start notification to the local-storage access-end notification and during the period from an application-data access-start notification to the application-data access-end notification, but the configuration is not limited to this. For example, as the shared-memory availability information, local-storage-access availability information indicating whether or not the local storage is currently being accessed, and application-data-access availability information indicating whether or not the application data are being accessed may be stored in the memory 125. In addition, each of the local-storage-access availability information and application-data-access availability information may include information indicating whether the availability information for a write request or a read request.

Second Embodiment

A second embodiment will now be described below with reference to the drawings.

Figure 4:
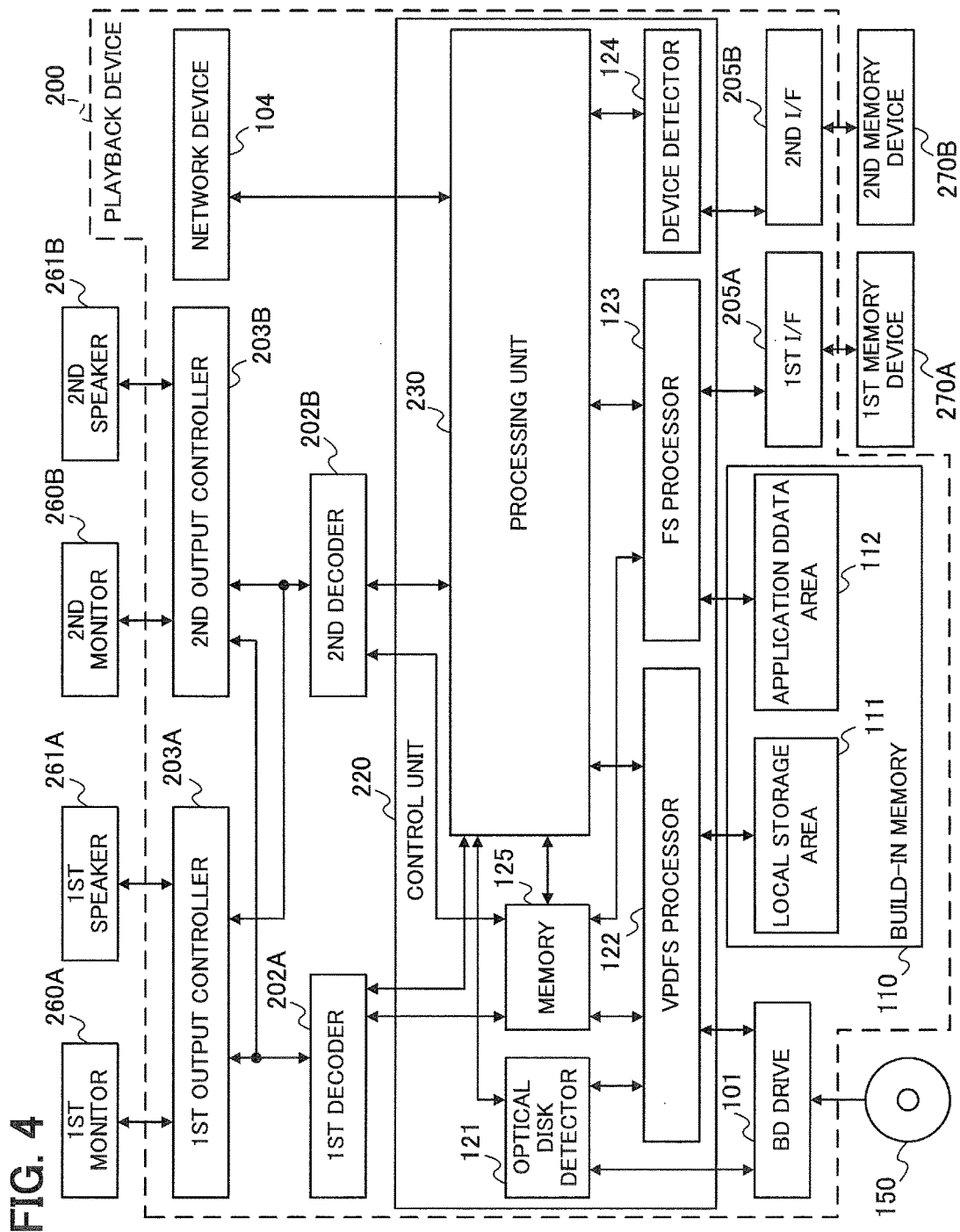
FIG. 4 is a block diagram schematically showing a configuration of a playback device according to a second embodiment.

FIG. 4 is a block diagram showing a configuration of a playback device 200 in the second embodiment. The playback device 200 is connected to a plurality of monitors 260A, 260B and speakers 261A, 261B in a rear entertainment system or the like, and is configured to enable viewing and listening of either the same content or viewing and listening different content.

As shown in FIG. 4, the playback device 200 includes a BD drive 101, a first decoder 202A, a second decoder 202B, a first output controller 203A, a second output controller 203B, a network device 104, a first interface (hereinafter referred to as a first I/F) 205A, a second interface (hereinafter referred to as a second I/F) 205B, a build-in memory 110, and a control unit 220. The playback device 200 in the second embodiment differs from the playback device 100 in the first embodiment in that it includes a plurality of decoders 202A, 202B, a plurality of output controllers 203A, 203B, and a plurality of I/F's 205A, 205B, and in the configuration of the control unit 220.

The playback device 200 in the second embodiment is connected to a plurality of monitors 260A, 260B and speakers 261A, 261B. For example, the first monitor 260A and the first speaker 261A are disposed in the left side of rear seat of a vehicle so that a user in the left side of rear seat of the vehicle views and listens. The second monitor 260A and second speaker 261B are disposed in the right side of rear seat of the vehicle so that a user in the right rear seat of the vehicle views and listens. Further, the playback device 200 includes the first output controller 203A for outputting video signals and audio signals to the first monitor 260A and first speaker 261A and the second output controller 203B for outputting video signals and audio signals to the second monitor 260B and second speaker 261B. The monitors 260A, 260B, speakers 261A, 261B, and output controllers 203A, 203B have the same functions as the monitor 160, speaker 161, and output controller 103, respectively, in the first embodiment.

The first output controller 203A is connected to the first decoder 202A, which has the same functions as the decoder 102 in the first embodiment, and the second output controller 203B is connected to the second decoder 202B, which has the same functions as the decoder 102 in the first embodiment. In a case where a user simultaneously views and listens the same content, the output signal from either the first decoder 202A or second decoder 202B is output to both output controllers 203A, 203B, and in a case where a user asynchronously views and listens different contents, the output signals from the decoders 202A, 202B are output to the respective output controllers 203A, 203B.

The control unit 220 controls each unit of the playback device 200.

The control unit 220 includes an optical disk detector 121, a VPDFS processor 122, an FS processor 123, a device detector 124, a memory 125, and a processing section 230. The control unit 220 in the second embodiment differs from the control unit 120 in the first embodiment in regard to the configuration of the processing section 230.

The processing section 230 executes the processing performed in the playback device 200.

Figure 5:
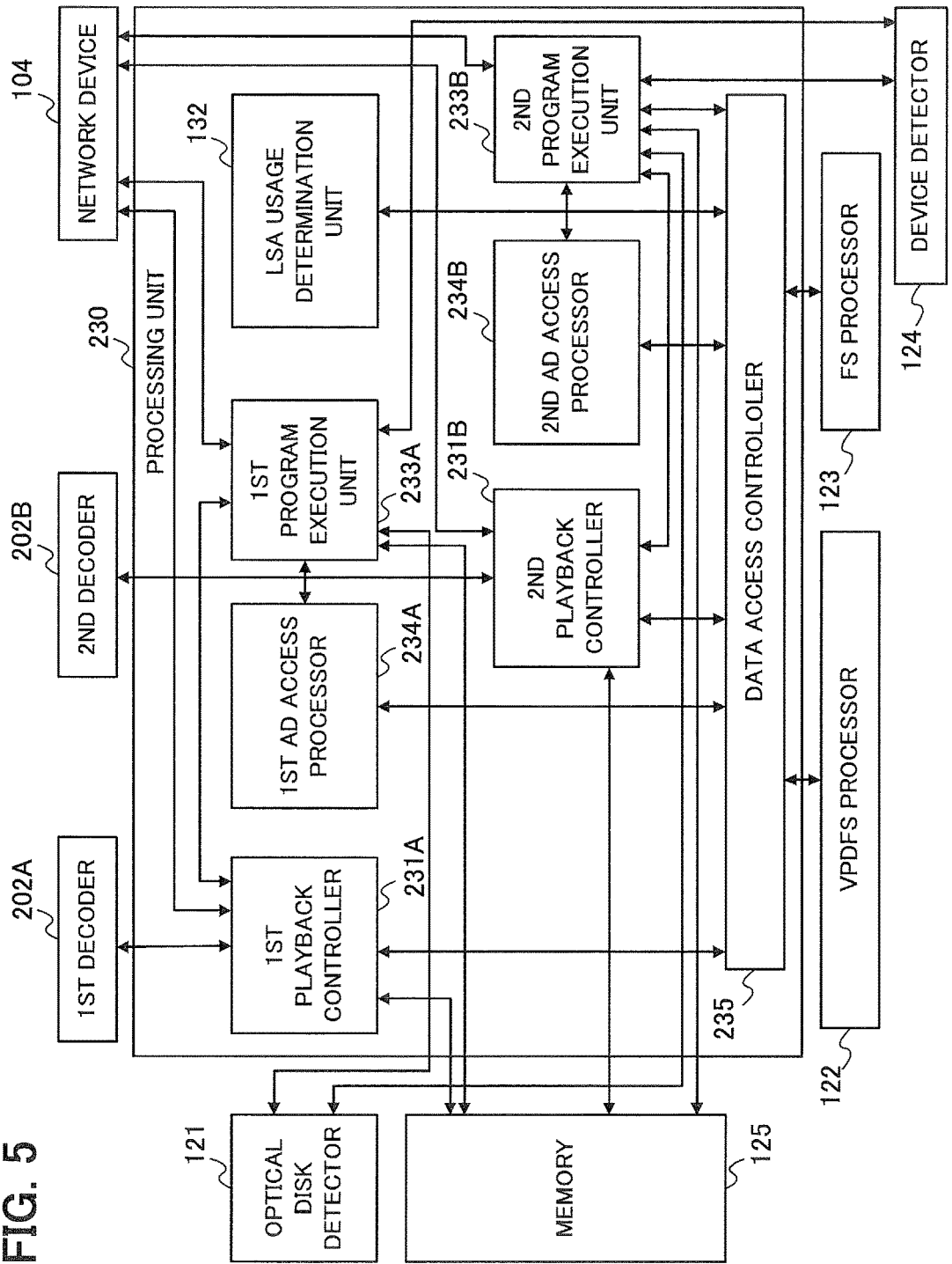
FIG. 5 is a block diagram schematically showing a configuration of the processor in the second embodiment.

FIG. 5 is a block diagram schematically showing a configuration of the processing section 230. As shown in the figure, the processing section 230 includes a first playback controller 231A, a second playback controller 231B, an LSA usage determination unit 132, a first program execution unit 233A, a second program execution unit 233B, a first AD access processor 234A, a second AD access processor 234B, and a data access controller 235.

In the second embodiment, in which different contents can be played back, a plurality of playback controllers 231A, 231B, program execution units 233A, 233B, and AD access processor 234A, 234B each are provided. The playback controller 231A, first program execution unit 233A, and first AD access processor 234A have the same functions as the playback controller 131, program execution unit 133, and AD access processor 134, respectively, in the first embodiment. The second playback controller 231B, second program execution unit 233B, and second AD access processor 234B has the same functions as the playback controller 131, program execution unit 133, and AD access processor 134, respectively, in the first embodiment.

Although the BD drive 101 is randomly accessible recording media, because of the seek processing characteristic of an optical disk device, there is a problem in practicability from the standpoint of the processing performance of the optical drive to playing back of different scenes by the first playback controller 231A and second playback controller 231B. Therefore, the first playback controller 231A and second playback controller 231B cannot carry out processing to access the BD drive 101 at the same time, and only one of them can carry out such processing. In other words, in a case where the BD drive 101 is used, the playback device 200 in the second embodiment can perform only synchronized viewing and listening of the same content.

The data access controller 235 performs the same processing as the data access controller 135 in the first embodiment in response to access requests from the first playback controller 231A, first AD access processor 234A, second playback controller 231B, and second application-data access processor 234B.

In a case where a BD-ROM 150 is inserted into the BD drive 101, the VPDFS processor 122 constructs virtual-package-data-file-system data so that data recorded in the BD-ROM 150 and data recorded in the local storage area 111 of the build-in memory 110 are combined to be treated as virtual package data. Then, one of the first playback controller 231A and second playback controller 231B, which have the same BDMV playback function as the playback controller 131 in the first embodiment, performs BDMV playback and at least one of the first output controller 203A and second output controller 203B performs output, thereby enabling, for example, at least one of the users in the left side of rear seat and the right side of rear seat to view and listen the content.

In addition, the plurality of I/F's 205A, 205B are included in the playback device 200 in the second embodiment so that a plurality of memory devices 270A, 270B can be connected. The first memory device 270A and second memory device 270B each are memory devices in which multimedia format data are recorded as AV files like the memory device 170 in the first embodiment, and can be implemented by SD cards, HDDs, or the like. For example, the first memory device 270A is connected to the first I/F 205A; the second memory device 270B is connected to the second I/F 205B.

In playback of memory devices 270A, 270B in which AV files are recorded, in response to an access request from at least one of the first playback controller 231A and second playback controller 231B, an AV file is played back in the same way as by the playback controller 131 in the first embodiment, and output is performed from at least one of the first output controller 203A and second output controller 203B so that, for example, at least one of the users in the left side of rear seat and the right side of rear seat can view and listen to the output.

In the second embodiment, even if the plurality of playback controllers 231A, 231B, program execution units 233A, 233B, and AD access processors 234A, 234B make access requests to the build-in memory (single memory) 110, in which a local storage area 111 and an application data area 112 are formed, access to the application data area 112 can be restrained as in the first embodiment.

In a case where an access request for the local storage area 111 from the first playback controller 231A or second playback controller 231B and an access request for the application data area 112 from the first AD access processor 234A or second AD access processor 234B occur simultaneously, in order to secure the transfer speed required for local storage, the data access controller 235 may monitor the maximum transfer speed of the build-in memory 110 and set priority levels to access requests from the first AD access processor 234A and second AD access processor 234B according to the required file size to be accessed. For example, the priority level may increase with decreasing the file size of the file to be accessed. The data access controller 235 may also make file system data access requests to the FS processor 123 according to the priority levels of the access requests. For example, access requests may be made in their order of priority, or by selecting access requests with higher priority than a predetermined priority.

DESCRIPTION OF REFERENCE CHARACTERS 100, 200 playback device, 101 BD drive, 102 decoder, 202A first decoder, 202B second decoder, 103 output controller, 203A first output controller, 203B second output controller, 104 network device, 105 interface, 205A first interface, 205B second interface, 110 build-in memory, 120, 220 control unit, 121 optical disk detector, 122 virtual-package-data file system processor, 123 file system processor, 124 device detector, 125 memory, 130, 230 processing unit, 131 playback controller, 231A first playback controller, 231B second playback controller, 132 local-storage-area usage determination unit, 133 program execution unit, 233A first program execution unit, 233B second program execution unit, 134 application-data access processor, 234A first application-data access processor, 234B second application-data access processor, 135, 235 data access controller.

What is claimed is:

1. A playback device comprising:
a virtual-package-data file system processor to treat a combination of first data recorded in a first recording unit and second data recorded in a local storage area in a second recording unit including the local storage area and an application data area as virtual package data and performs reading and writing of the virtual package data;
a file system processor to perform reading and writing of application data recorded in the application data area;
a playback controller to control playback of the virtual package data;
a processing execution unit to process the application data; and
a data access controller to cause the virtual-package-data file system processor to perform reading or writing of the virtual package data according to a first access request from the playback controller, the first access request requesting reading and writing of the virtual package data, and to cause the file system processor to perform reading or writing of the application data according to a second access request from the processing execution unit, the second access request requesting reading or writing of the application data; wherein
in a case where the first access request from the playback controller is a request for requesting reading or writing in the local storage area, the data access controller causes the virtual-package-data file system processor to perform the reading or writing of the virtual package data with priority over the reading or writing of the application data by the file system processor.

2. The playback device of claim 1, wherein, in a case where the data access controller receives the first access request that requests reading or writing in the local storage area from the playback controller while the data access controller is causing the file system processor to perform the reading or writing of the application data according to the second access request from the processing execution unit, the data access controller cancels the reading or writing of the application data and causes the virtual-package-data file system processor to perform the reading or writing of the virtual package data according to the received first access request.

3. The playback device of claim 1, wherein, in a case where the data access controller is causing the virtual-package-data file system processor to perform the reading or writing of the virtual package data in the local storage area according to the first access request from the playback controller when the data access controller receives the second access request from the processing execution unit, the data access controller denies the received second access request.

4. The playback device of claim 1, wherein, in a case where the data access controller is causing the virtual-package-data file system processor to perform the reading or writing of the virtual package data in the local storage area according to the first access request from the playback controller when the data access controller receives the second access request from the processing execution unit, the data access controller causes the file system processor to perform the reading or writing of the application data if the application data to be read or written according to the received second access request have a size smaller than a predetermined size, and denies the received second access request if the application data to be read or written according to the received second access request have a size equal to or greater than the predetermined size.

5. The playback device of claim 1, wherein, in a case where the data access controller is causing the virtual-package-data file system processor to perform the reading or writing of the virtual package data in the local storage area according to the first access request from the playback controller when the data access controller receives the second access request from the processing execution unit, the data access controller causes the file system processor to perform the reading or writing of the application data on the basis of a priority level of the application data to be read or written according to the received second access request.

6. The playback device of claim 5, wherein the priority level increases in value with decreasing size of the application data.

7. The playback device of claim 1, wherein the first recording unit is configured by a drive unit into which a playback-only recording medium on which the first data are recorded is inserted, the drive unit being capable of reading the first data from the playback-only recording medium.

8. The playback device of claim 1, wherein the playback controller identifies the virtual package data to be played back;
the playback device further comprising a playback unit to play back the virtual package data identified by the playback controller.

9. The playback device of claim 8, wherein the playback device is equipped with a plurality of the playback controllers, the playback units, and the processing execution units.

10. A playback method comprising:
controlling playback of the virtual package data;
performing reading or writing of the virtual package data obtained by combining first data recorded in a first recording unit and second data recorded in a local storage area in a second recording unit according to a first access request;
processing application data recorded in an application data area in the second recording unit;
performing reading or writing of the application data recorded in the application data area in the second recording unit according to a second access request; and
in a case where the first access request is a request for requesting reading or writing in the local storage area, causing to perform the reading or writing of the virtual package data with priority over the reading or writing of the application data.

11. The playback method of claim 10, further comprising, in a case where the first access request that requests reading or writing in the local storage area is issued while the reading or writing of the application data are being performed canceling the reading or writing of the application data and reading or writing the virtual package data according to the issued first access request.

12. The playback method of claim 10, further comprising, in a case where the reading or writing of the virtual package data in the local storage area is being performed when the second access request is issued denying the issued second access request.

13. The playback method of claim 10, in a case where the reading or writing of the virtual package data in the local storage area is being performed when the second access request is issued performing the reading or writing of the application data to be read or written if the application data to be read or written according to the issued second access request have a size smaller than a predetermined size, and denying the received second access request if the application data to be read or written according to the issued second access request have a size equal to or greater than the predetermined size.

14. The playback method of claim 10, wherein, in a case where the reading or writing of the virtual package data in the local storage area is being performed when the second access request is issued performing the reading or writing of the application data to be read or written on the basis of a priority level of the application data to be read or written according to the issued second access request.

15. The playback method of claim 14, wherein the priority level increases in value with decreasing size of the application data.

16. The playback method of claim 10, wherein the first recording unit is configured by a drive unit into which a playback-only recording medium on which the first data are recorded is inserted, the drive unit being capable of reading the first data from the playback-only recording medium.

* * * * *